United States Patent
Hassane

(10) Patent No.: US 7,047,364 B2
(45) Date of Patent: May 16, 2006

(54) CACHE MEMORY MANAGEMENT

(75) Inventor: Mehdi M. Hassane, Limerick (IE)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 10/748,693

(22) Filed: Dec. 29, 2003

(65) Prior Publication Data

US 2005/0144391 A1 Jun. 30, 2005

(51) Int. Cl.
*G06F 12/00* (2006.01)

(52) U.S. Cl. ............... 711/133; 711/147; 711/141; 711/3

(58) Field of Classification Search ............... None
See application file for complete search history.

(56) References Cited

U.S. PATENT DOCUMENTS 5,796,996 A * 8/1998 Temma et al. ............... 712/225
6,003,116 A * 12/1999 Morita et al. ............... 711/141
6,397,305 B1 * 5/2002 Knight et al. ............... 711/147
2002/0038408 A1 * 3/2002 Metayer et al. ............. 711/141
2003/0140199 A1 * 7/2003 Kunkel et al. .............. 711/141

* cited by examiner

*Primary Examiner*—Matthew D. Anderson
*Assistant Examiner*—Michael Krofcheck
(74) *Attorney, Agent, or Firm*—Fish & Richardson P.C.

(57) ABSTRACT

Management of accessing data in a main memory and a cache memory includes, for each unit of data transferred from a first processor to a second processor, filling a cache set of the cache memory with data associated with addresses in the main memory that correspond to the cache set after the first processor writes a unit of data to addresses that correspond to the cache set. For each unit of data transferred from the second processor to the first processor, filling the cache set with data associated with addresses in the main memory that correspond to the cache set before the first processor reads a unit of data written by the second processor to addresses that correspond to the cache set. The data used to fill the cache set are associated with addresses that are different from the addresses associated with the unit of data.

35 Claims, 6 Drawing Sheets

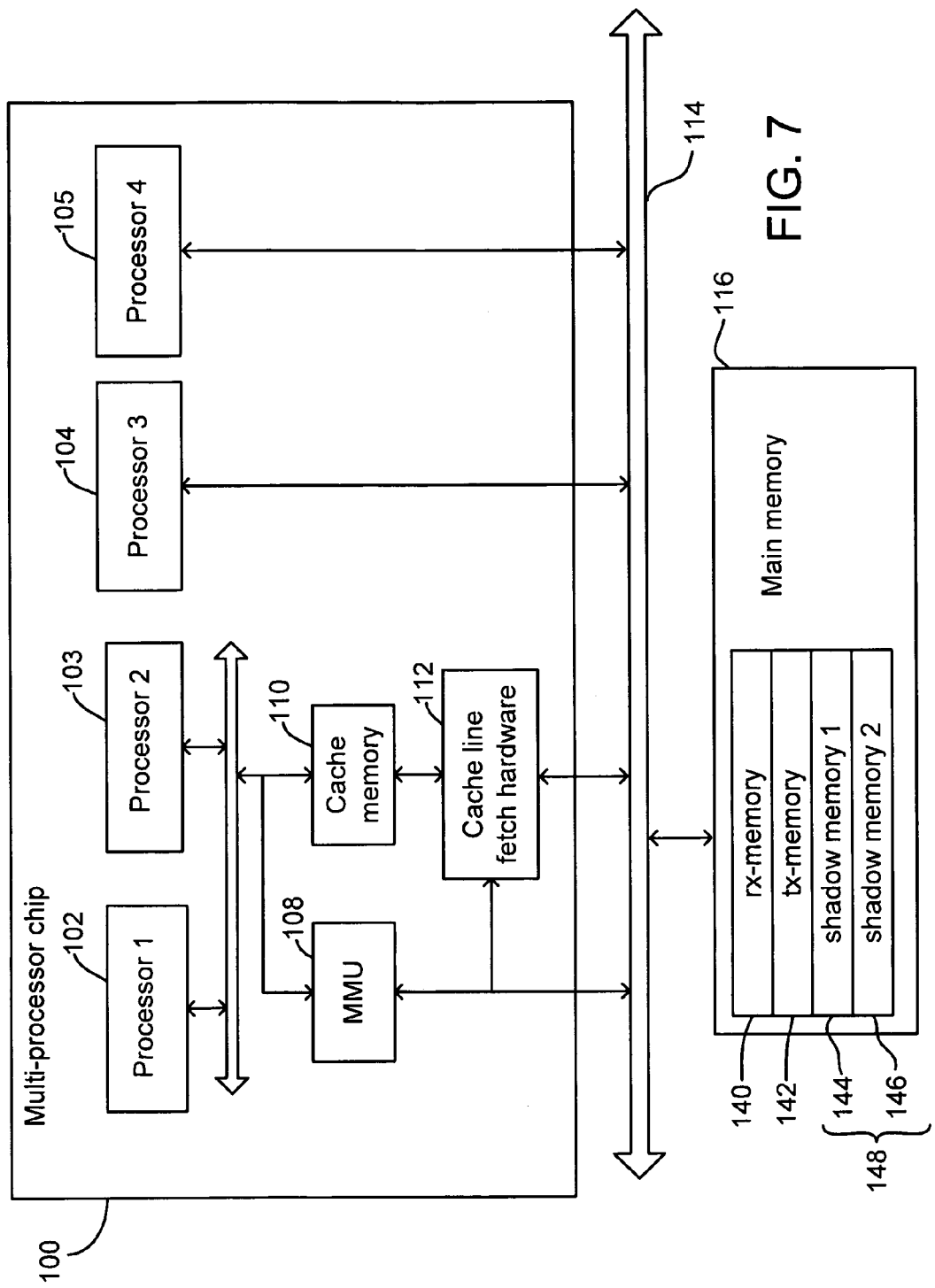

CACHE MEMORY MANAGEMENT

BACKGROUND

A multi-processor chip includes several processors that communicate with one another, and may share certain addresses in a memory for storing data that are commonly used by the processors. The memory may reside in a chip separate from the multi-processor chip. One processor may have an on-chip cache memory to facilitate faster access of often used data. The cache memory may be accessible to only one processor and not accessible to other processors. Because the cache memory is not shared among different processors, certain procedures are followed in order to maintain memory coherency, i.e., ensure that all of the processors are accessing the same data when reading from or writing to the same shared address.

One method of enforcing memory coherency is to mark the memory locations that are shared between the processors as uncachable. The processors access the external main memory each time data is retrieved from or written to these shared addresses without accessing the cache memory. Another method of enforcing memory coherency is to invalidate the shared address locations prior to reading from them and flushing the shared address locations after writing to them. This may involve calling flush subroutines or invalidate subroutines, storing data in a stack, calculating cache line boundaries, flushing or invalidating a cache line, retrieving the data from the stack, and returning from the subroutine.

DESCRIPTION OF DRAWINGS

FIG. 7 depicts a system having a multi-processor chip.

DETAILED DESCRIPTION

Figure 1:
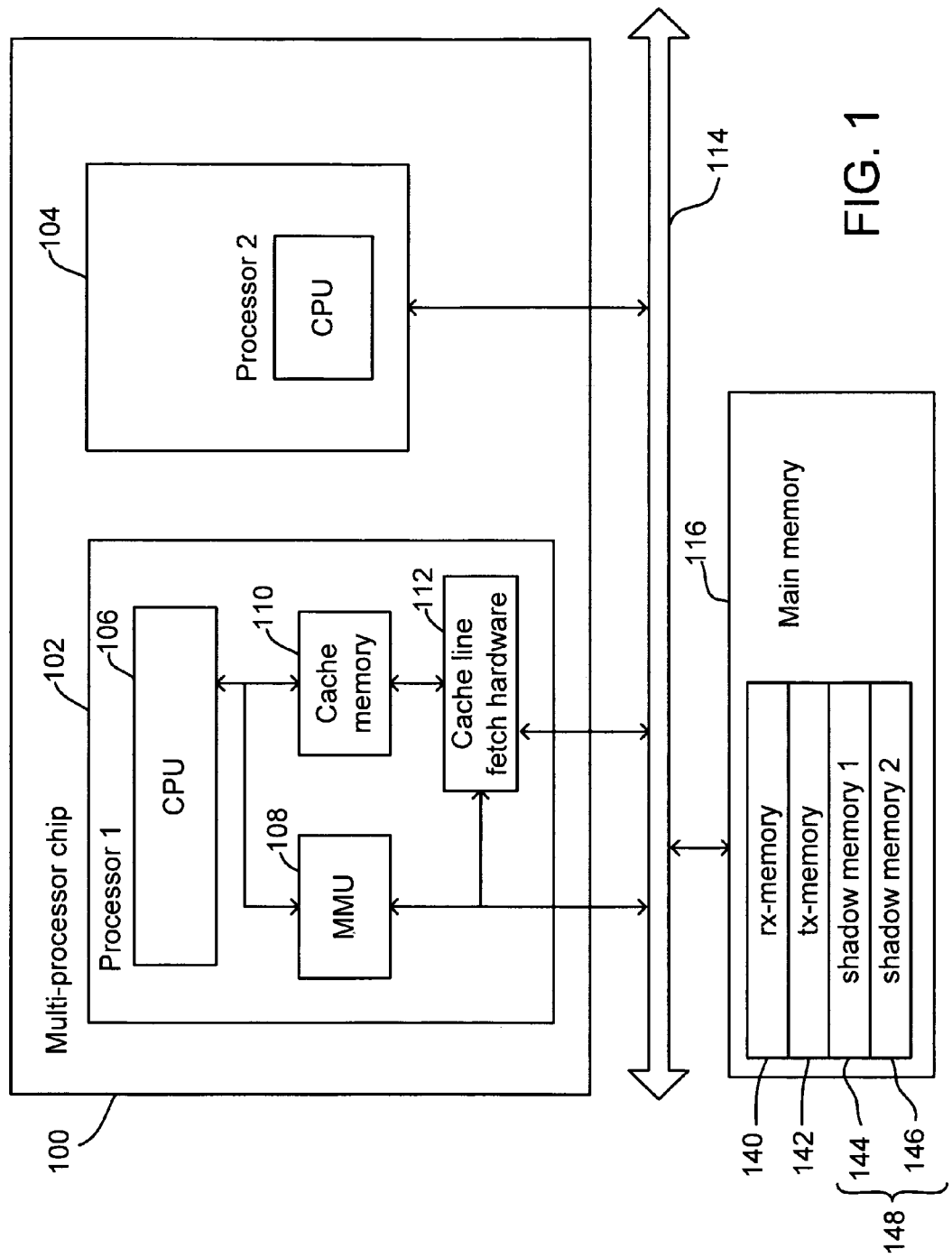
FIG. 1 depicts a system having a multi-processor chip.

Referring to FIG. 1, a multi-processor 100 includes a first data processor 102 and a second data processor 104, both processors sharing at least a portion of a main memory 116. Main memory 116 is coupled to the multi-processor 100 through a data bus 114. Processor 102 has a central processing unit (CPU) 106 and a cache memory 110 that allows the CPU 106 to have faster access to cached data that can be cached using any one of a number of caching policies, e.g., most recently used data, pre-fetched data, and so forth. The cache memory 110 is not accessible to the processor 104. Processor 102 includes a memory management unit (MMU) 108 and a cache line fetch hardware 112 that, in response to read and write instructions from the CPU 106, manage access of data stored in the cache memory 110, including determining whether to fetch data from the cache memory 110 or from the main memory 116, and whether to flush data from the cache memory 110 to the main memory 116.

In one example, the first processor uses a dummy read operation to access memory. By using "dummy read" operations (described in more detail below) prior to a read operation or after a write operation, the CPU 106 ensures that read data from the processor 104 is retrieved from the main memory 116 and that write data intended for the processor 104 is written into the main memory 116.

Figure 2:
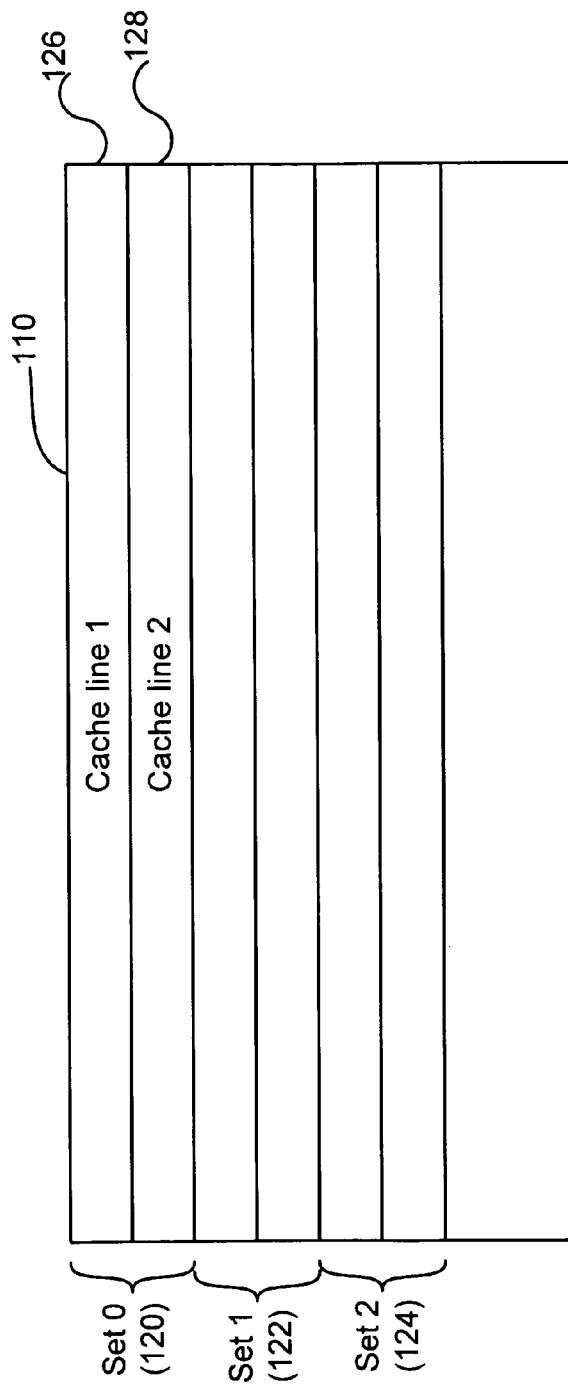
FIG. 2 shows a cache memory.

Referring to FIG. 2, in one example, the cache memory 110 is a set-associative cache memory that is divided into cache sets, such as cache set 0 (120), cache set 1 (122), and cache set 2 (124). Each cache set has two 32-byte cache lines, such as cache line 1 (126) and cache line 2 (128). Each cache set corresponds to particular locations of the main memory 116 so that if data from the particular locations are stored in the cache memory 110, the data will be stored in the same cache set.

Figure 3:
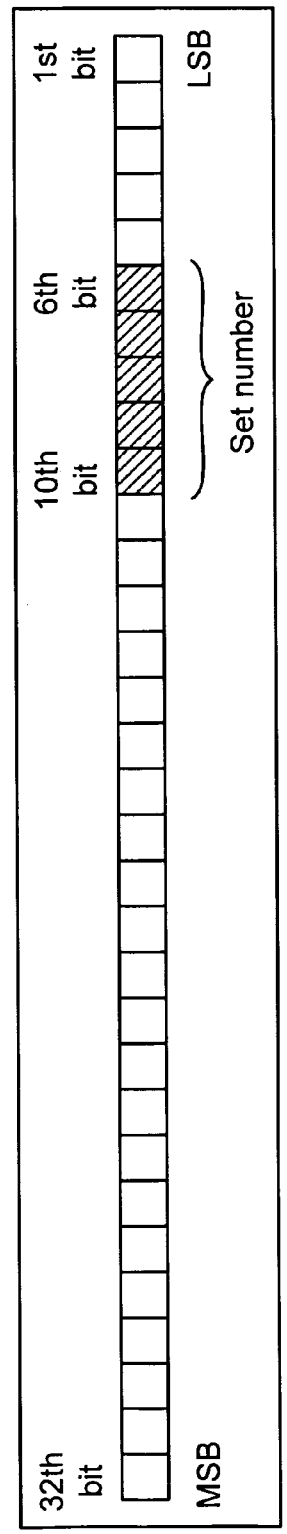
FIG. 3 shows an address configuration.

Referring to FIG. 3, in one example, the main memory 116 uses 32-bit addresses, and the $6^{th}$ to $10^{th}$ bits of an address determine the cache set number corresponding to the address. Each address is associated with one byte of data. When data are read from addresses having the same $6^{th}$ to $10^{th}$ bits, copies of the data will be stored in the same cache set. For example, data having addresses "00000000000000000000001111100000" and "00000000000110011000001111100101" will be stored in the same cache set because the $6^{th}$ to $10^{th}$ bits of the addresses are the same: "11111". In the above example, addresses with the same $6^{th}$ to $10^{th}$ bits are referred to as being within the same segment of the main memory 116.

The MMU 108 is configured so that when the CPU 106 attempts to read data from an address in the main memory 116, and data from that address is already stored in the cache memory 110, the MMU 108 will fetch the data from the cache memory 110 rather than from the main memory 116. Since accessing the cache memory 110 is faster than accessing the main memory 116, this allows the CPU 106 to obtain the data faster. If data from the address specified by the CPU 106 is not stored in the cache memory 110, the MMU 108 will fetch the data from the main memory 116, send the data to the CPU 106, and store a copy of the data in the cache memory 110.

In the example shown in FIG. 2, each cache set has two cache lines, and can store two 32-byte data from the same segment of the main memory 116 corresponding to the cache set. The MMU 108 is designed so that when the CPU 106 attempts to read from an address in which the corresponding cache set is full, the MMU 108 flushes a cache line so that the data in the cache line is stored into the main memory 116, allowing the flushed cache line to store new read data.

In some situations, the CPU 106 may need to read data directly from an address in the main memory 116 and not from the cache memory 110 regardless of whether data corresponding to the address is stored in the cache memory 110. One such situation is when the second processor 104 writes data (referred to as "new data") to an address (referred to as "target address") in the main memory 116, and notifies the first processor 102 that there is new data that needs to be fetched. The second processor 104 does not have access to and does not update the cache memory 110, which may have already stored data (referred to as "old data") corresponding to the target address. This may occur if the first processor 102 had read from the target address a short time earlier.

If the CPU 106 attempts to read data from the target address, the MMU 108 will determine whether data corresponding to the target address is stored in the cache memory 110, and if such data exists in the cache memory 110, retrieve the data from the cache memory 110 instead of from the main memory 116. This results in the MMU 108 retrieving the old data from the cache memory 110 rather than the new data from the main memory 116.

To ensure that the first processor 102 retrieves the new data from the target address in the main memory 116, the cache set corresponding to the target address is filled with "dummy data" (discussed below) before the first processor 102 issues a read instruction to read the new data from the target address. Because the cache set is full, upon receiving the read instruction, the MMU 108 automatically flushes a cache line in the cache set and fetches the new data from the main memory 116.

When the MMU 108 flushes a cache line due to the cache set being full, the MMU 108 does so without taking up CPU cycle time. By comparison, if the CPU 106 needs to read data from an address in the main memory when the cache set corresponding to the address is not full, the CPU 106 has to explicitly request the MMU 108 to invalidate a cache line or flush a cache line, which may take up several CPU cycles, preventing the CPU from performing other useful tasks.

Figure 4:
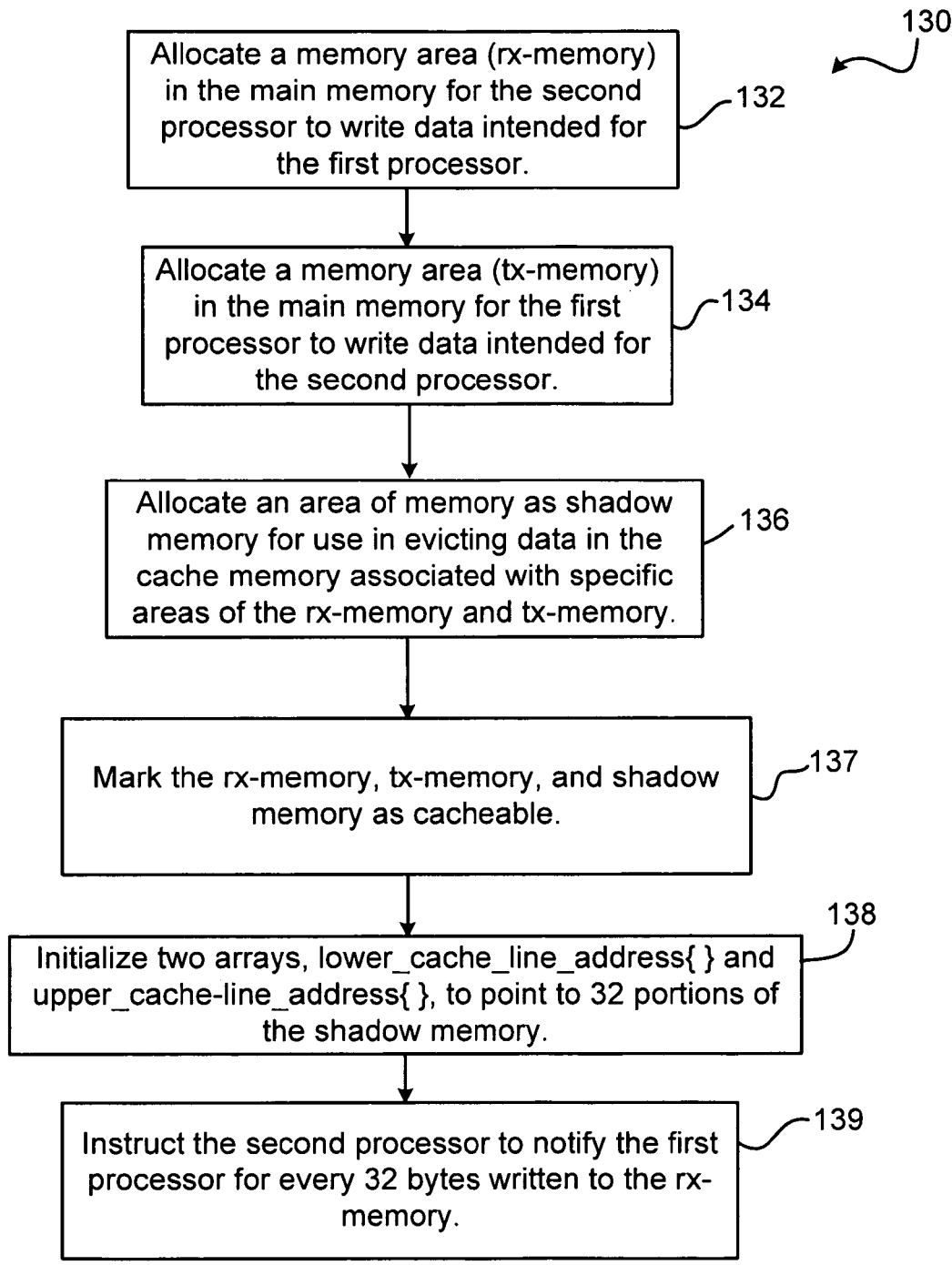
FIGS. 4–6 show processes for managing accesses to the main memory and the cache memory.

Referring to FIG. 4, a process 130 to initialize areas of the main memory 116 so that the first processor 102 can implement a process to fill a cache set corresponding to a target address with "dummy data" before issuing a read instruction to read new data from the target address is shown.

In process 130, a memory area 140 (referred to as the rx-memory, see FIG. 1) in the main memory 116 is allocated (132) for the second processor 104 to write data intended for the first processor 102. A memory area 142 (referred to as the tx-memory) in the main memory 116 is allocated (134) for the first processor 104 to write data intended for the second processor 104. A shadow memory 148 is allocated (136) for use in evicting data in the cache memory 110 that are associated with specific areas of the rx-memory 140 and the tx-memory 142.

The rx-memory 140 is allocated on cache line boundaries in the main memory 116, meaning that the first byte of the rx-memory corresponds to a first byte of a cache line, and the last byte of the rx-memory 140 corresponds to a last byte of a cache line. The tx-memory 142 and the shadow memory 148 are also allocated on cache line boundaries. The size of the shadow memory 148 is selected to be 2048 bytes (the same as the cache memory size). When the $6^{th}$ to the $10^{th}$ bits are used to determine the cache set number, the size of the rx-memory 140 is selected to be a multiple of 1024 bytes, the size of the tx-memory 142 is selected to be a multiple of 1024 bytes. The shadow memory 148 includes memory portions 144 and 146. Memory portion 144 refers to the lower 1024-byte portion of the shadow memory 148. Memory portion 146 refers to the higher 1024-byte portion of the shadow memory 148.

After the rx-memory 140, the tx-memory 142, and the shadow memory 148 are allocated, the first processor 102 notifies the MMU 108 to mark (137) the rx-memory 140, the tx-memory 142, and the shadow memory 148 as cacheable, meaning that data in the rx-memory 140, the tx-memory 142, and the shadow memory 148 can be stored in the cache memory 110.

The memory portions 144 and 146 are each divided into 32 portions, each portion having 32 bytes and corresponding to a cache line. The first CPU 106 initializes (138) an array, lower_cache_line_address{ }, that has 32 entries, each pointing to the first address of one of the 32-byte portions of the memory portion 144. Another array, upper_cache_line_address{ }, is initialized (138) to have 32 entries, each pointing to the first address of one of the 32-byte portions of the memory portion 146.

The first processor 102 instructs (139) the second processor 104 to notify the first processor 102 for every 32 bytes written to the rx-memory 140, and to pass the offset value of the last byte that was modified relative to the beginning of the rx-memory 140.

Figure 5:
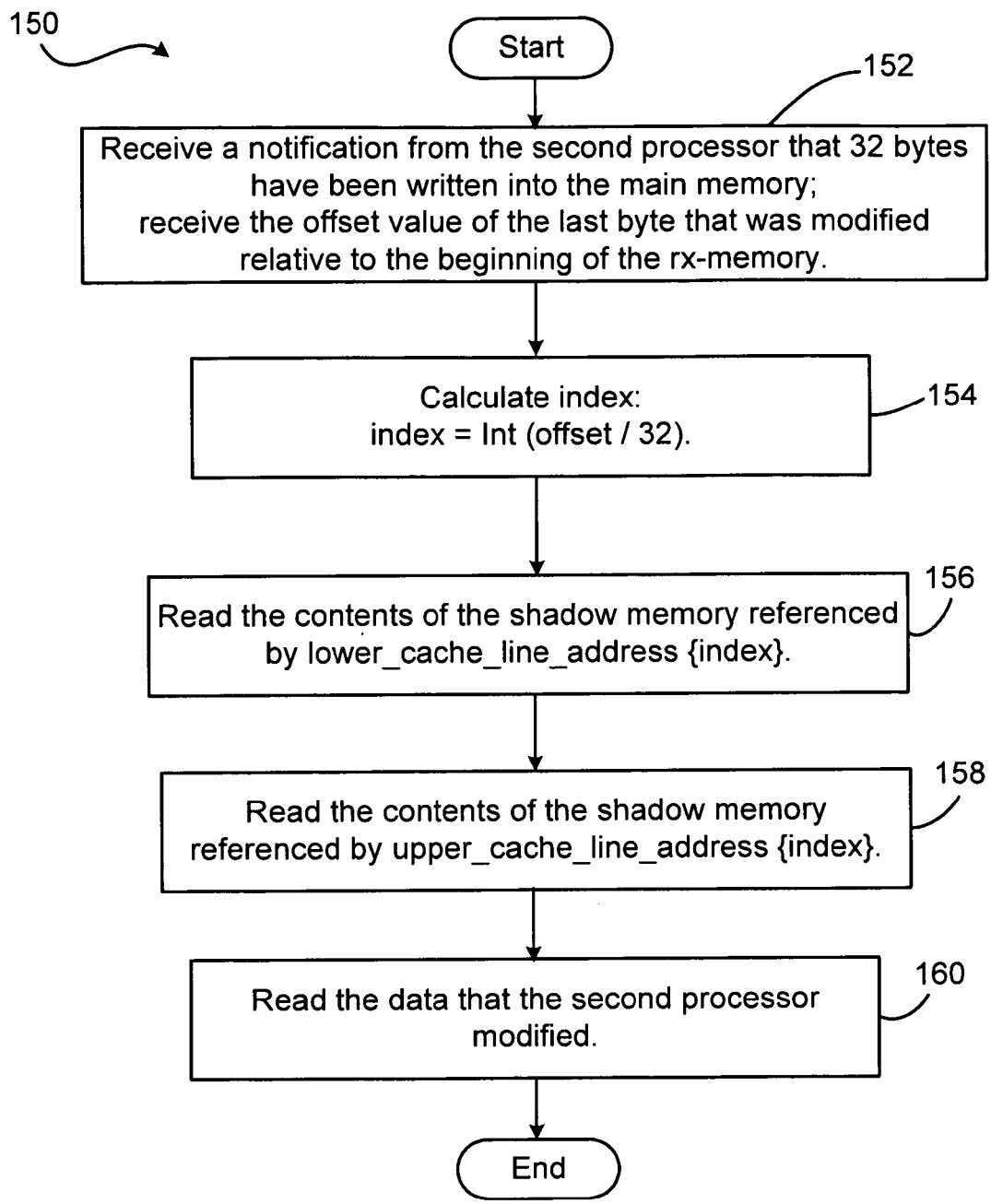

Referring to FIG. 5, after the initialization process 130, the first processor 102 implements a process 150 to read data that is written to the main memory 116 by the second processor 104.

As instructed during the initialization process 130, the second processor 104 notifies the first processor 102 for every 32 bytes written to the rx-memory 140 and passes the offset value of the last byte that was modified relative to the beginning of the rx-memory 140. The first processor 102 receives (152) offsets having a pattern (32×n−1), where n is an integer, so that the offset values will be 31, 63, 95, 127, and 159, etc.

For each offset, the CPU 106 calculates (154) an index to the lower_cache_line_address{ } and the upper_cache_line_address{ } by using an integer division of the offset by 32, i.e., index=Int (offset/32), where Int( ) represents integer division. The value stored in lower_cache_line_address{index} represents the first address of a cache line in the memory portion 144 that will be stored in the same cache set as the portion of rx-memory 140 that has been modified by the second processor 104. The value stored in upper_cache_line_address{index} represents the first address of a cache line in the memory portion 146 that will be stored in the same cache set as the portion of rx-memory 140 that has been modified by the second processor 104. The two caches lines referenced by lower_cache_line_address{index} and upper_cache_line_address{index} are stored in the same cache set as the portion of the rx-memory 140 that has been modified by the second processor 104 because the $6^{th}$ to $10^{th}$ bits of their addresses are the same.

The CPU 106 reads (156) the contents of the shadow memory 148 referenced by the lower_cache_line_address{index}, and reads (158) the contents of the shadow memory 148 referenced by the upper_cache_line_address{index}. This causes the MMU 108 to fill the cache set with dummy data, meaning that the data read from the shadow memory 148 is not useful to the CPU 106. Because a cache set only has two cache lines, the reading (156) of contents of lower_cache_line_address{index} and reading (158) of upper_cache_line_address{index} cause the MMU 108 to automatically evict any data that correspond to the addresses that the second processor 104 modified.

Because the cache set is full of data that correspond to addresses different from the addresses that the second processor 104 has modified, when the CPU 106 reads (160) the address that the second processor 104 has modified, the MMU 108 automatically flushes a cache line in the cache set and loads the data that the second processor 104 has modified from the main memory 116.

Process 150 ensures that the first processor 102 obtains the most current version of the data that has been modified by the second processor 104.

When the first processor 102 writes data to addresses in the tx-memory 142, the data is initially stored in the cache memory 110. Because the second processor 104 cannot access the cache memory 110, the data intended for the second processor 104 has to be flushed from the cache memory 110 and written into the main memory 116.

Figure 6:
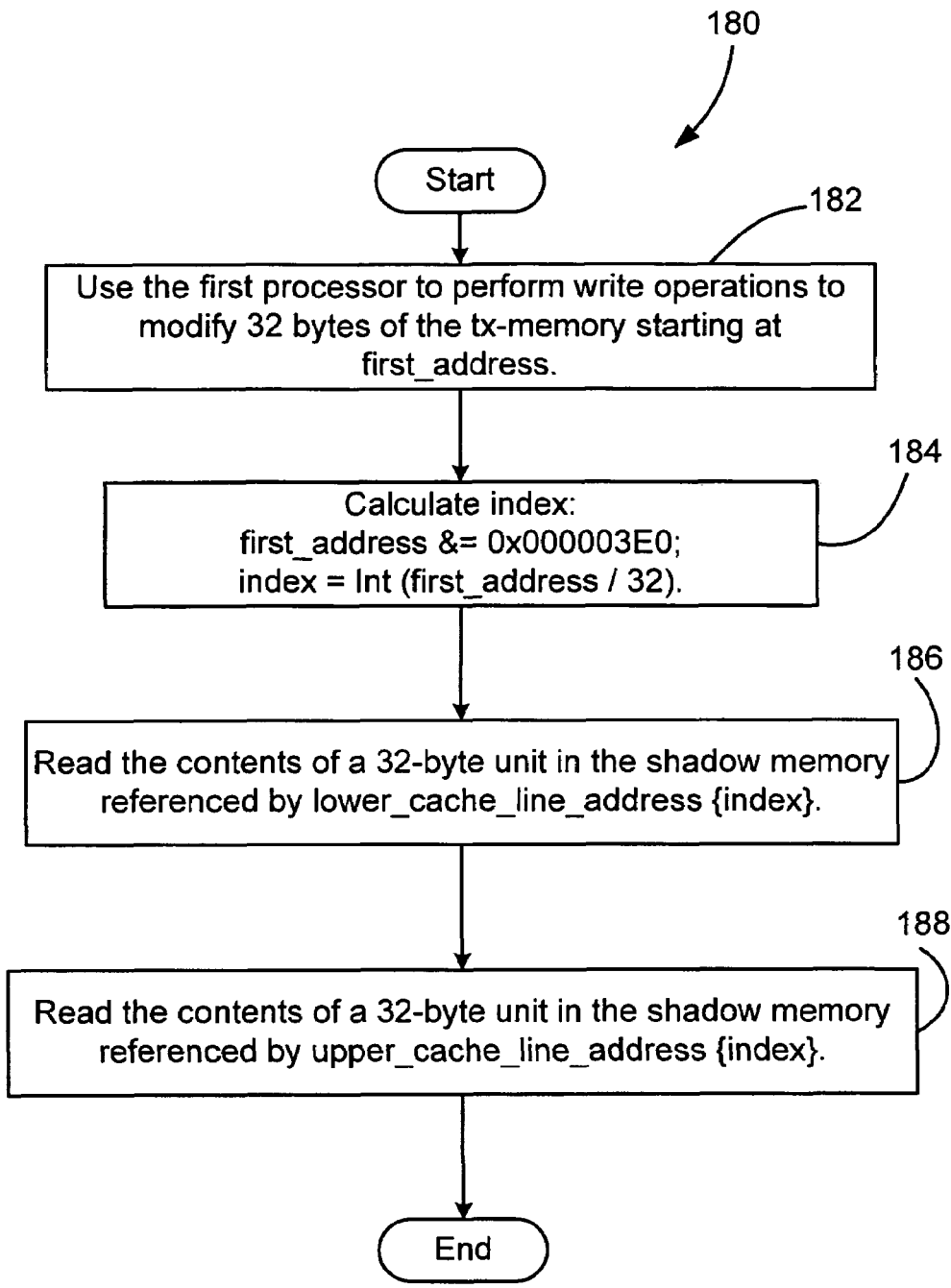

Referring to FIG. 6, the first processor 102 implements a process 180 to write data to the main memory 116, the data being intended for the second processor 104. The first processor 102 performs write operations (182) to write 32 bytes of data to the tx-memory 142, starting at a first_address that corresponds to a first address of a cache line in the tx-memory. The 32 bytes of data are initially stored in a cache line of the cache memory 110.

The first processor 102 calculates (184) an index from the first_address, the index used for the arrays lower_cache_line_address{ } and upper_cache_line_address{ }. The first processor 102 determines the $6^{th}$ to $10^{th}$ bits of the first_address value by performing an AND operation of the first_address and 0x000003E0:

first_address=first_address & 0x000003E0, which masks all bits of first_address as zero except for the $6^{th}$ to $10^{th}$ bits. The first processor 102 then calculates the index by using an integer division of 32:

index=Int(first_address/32).

The processor 102 reads (186) the contents of a 32-byte unit in the memory portion 144 referenced by the address stored in lower_cache_line_address{index}. The processor reads (188) the contents of a 32-byte unit in the memory portion 146 referenced by the address stored in upper_cache_line_address{index}. The 32-byte unit pointed to by the lower_cache_line_address{index} and the 32-byte unit pointed to by the upper_cache_line_address{index} are stored in the same cache set as the 32-byte data written by the first processor 102, thus the 32-byte data written by the first processor 102 is evicted from the cache set and stored into the tx-memory 142.

Process 180 ensures that the second processor 104 obtains the most current version of the data that has been modified by the first processor 102.

In one example, the first processor 102 is a general-purpose data processor, and the second processor 104 is a network/voice data processor that processes voice data transferred through a network. The general-purpose data processor has access to a cache memory, which is not shared with the network/voice data processor. Software applications that use the general data processor to process voice data received from the network requires transfers of data between the general-purpose data processor and the network/voice data processor. The processes 130, 150, and 180 can be used to ensure that each processor obtains the most current version of data sent by the other processor. In one example, the second processor 104 is configured to process data packets routed by a network router according to predefined communication protocols.

Although some examples have been discussed above, other implementations and applications are also within the scope of the following claims. For example, the cache memory 110 can have cache lines having sizes different from 32 bytes, and each cache set can have more than two cache lines. The size of the shadow memory 148 and the amount of dummy data that is read in processes 150 and 180 are adjusted accordingly.

For example, if the cache memory 110 has 3096 bytes, each cache set having three cache lines, each cache line having 32 bytes, then the shadow memory 148 is allocated to have three 1024-byte memory portions. In process 150, before the first processor 102 performs a read operation to read data in the rx-memory 140 written by the second processor 104, the first processor 102 performs three read operations to read 32-byte data from each of the three memory portions of the shadow memory 148. This ensures that the first processor 102 reads from the rx-memory 140, and not from a cache line in the cache memory 110.

Similarly, in process 180, after the first processor 102 performs a write operation to write data to the tx-memory 142, the first processor 102 performs three read operations to read 32-byte data from each of the three memory portions of the shadow memory 148. This ensures that the 32-byte data written by the first processor 102 is flushed to the tx-memory 142 and is available to the second processor 104.

In the example above, the upper_cache_line_address{ } and the lower_cache_line_address{ } arrays are replaced with three arrays, $1^{st}$_cache_line_address{ }, $2^{nd}$_cache_line_address{ }, and $3^{rd}$_cache_line_address{ }. The $1^{st}$_cache_line_address{ } has 32 entries, each pointing to the first address of one of 32-byte portions of the first 1024-byte memory portion of the shadow memory 148. Similarly, the $2^{nd}$_cache_line_address{ } has 32 entries, each pointing to the first address of one of 32-byte portions of the second 1024-byte memory portion of the shadow memory 148, and the $3^{rd}$_cache_line_address{ } has 32 entries, each pointing to the first address of one of 32-byte portions of the third 1024-byte memory portion of the shadow memory 148.

In an alternative example, the rx-memory 140 has a size that is a multiple of the number of cache sets multiplied by the number of bytes in each cache line. Thus, if the cache memory 110 has n1 cache sets, each cache line including n2 bytes, the rx-memory 140 is a multiple of n1×n2 bytes. Likewise, the tx-memory 142 has a size that is a multiple of the number of cache sets multiplied by the size of each cache line. The shadow memory 148 has a size that is a multiple of the number of cache sets multiplied by the number of cache lines in each cache set multiplied by the size of each cache line. Thus, if the cache memory 110 has n1 cache sets, each cache line including n2 bytes, each cache set including n3 cache lines, the shadow memory 148 is selected to be a multiple of n1×n2×n3 bytes.

In the alternative example above, if each cache set has n3 cache lines, then n3 arrays (e.g., $1^{st}$_cache_line_address{ }, $2^{nd}$_cache_line_address{ }, . . . , n3_cache_line_address{ }) are used to store addresses of the first byte of 32-byte portions of the shadow memory 148. The i-th array (e.g., i-th_cache_line_address{ }) has 32 entries, each pointing to the first address of one of 32-byte portions of the i-th 1024-byte memory portion of the shadow memory 148.

Referring to FIG. 7, the multi-processor 100 can have more than two processors. For example, as shown multi-processor 100 includes processors 102, 103, 104, and 105, all of which share the main memory 116. Processors 102 and 103 share the cache memory 110, which is not accessible to processors 104 and 105. In this example, when the processor 102 or 103 writes data to the tx-memory 142 intended for the processor 104 or 105, dummy read operations are performed to flush the data from the cache memory 110 to the tx-memory 142. Similarly, dummy read operations are performed prior to using processor 102 or processor 103 to read the data from the rx-memory 140 (the data being written by the processor 104 or 105), to ensure that the data is fetched from the rx-memory 140 rather than from the cache memory 110.

In FIG. 3, the $6^{th}$ to $10^{th}$ bits of the memory address are used to determine the cache set number. Other configurations can also be used, such as using the $5^{th}$ to $11^{th}$ bits of the memory address to determine the cache set number.

Other embodiments are within the scope of the following claims.

What is claimed is:

1. A method comprising:
    for each unit of data transferred between a first processor and a second processor, filling a cache set of a cache memory with data associated with addresses in a main memory that correspond to the cache set, either after the first processor writes a unit of data to addresses that correspond to the cache set or before the first processor reads a unit of data written by the second processor to addresses that correspond to the cache set, with the data used to fill the cache set being associated with addresses that are different from the addresses associated with the unit of data.

2. The method of claim 1 wherein filling the cache set with data comprises performing read operations to read data from addresses that are different from the addresses of the unit of data written by the second processor.

3. The method of claim 2 wherein performing read operations comprises using the first processor to perform the read operations.

4. The method of claim 2 wherein each cache set comprises a predetermined number of cache lines, wherein the number of read operations performed to read data to fill the cache set is equal to the predetermined number of cache lines.

5. The method of claim 1 wherein each cache set comprises a predetermined number of cache lines, and filling the cache set comprises writing data to at least a portion of each cache line in the cache set.

6. The method of claim 1 wherein each unit of data has a size that corresponds to a cache line of the cache memory.

7. The method of claim 1 wherein the first processor has access to the cache memory.

8. The method of claim 1 wherein the second processor does not have access to the cache memory.

9. The method of claim 1 wherein each cache set of the cache memory is associated with particular addresses in the main memory.

10. The method of claim 1, further comprising using the second processor to write a unit of data to addresses in the main memory that correspond to the cache set, and notifying the fast processor that a unit of data has been written to the main memory.

11. The method of claim 1, further comprising using a memory management unit to evict cached data associated with the same addresses as the unit of data after performing the read operations reading data associated with addresses that correspond to the same cache set as the addresses of the unit of data.

12. The method of claim 1, further comprising using the first processor to write a unit of data to addresses that correspond to the cache set, the unit of data being stored in the cache set before the cache set is filled with data associated with different addresses that also correspond to the cache set.

13. The method of claim 1, further comprising allocating a first portion of the main memory so that it does not store data transferred between the first and second processors.

14. The method of claim 13, further comprising allocating a second portion of the main memory to store data transferred from the first processor to the second processor.

15. The method of claim 14, further comprising reading data from the first portion after using the first processor to write data to addresses corresponding to the second portion.

16. The method of claim 13, further comprising allocating a second portion of the main memory to store data transferred from the second processor to the first processor.

17. The method of claim 16, further comprising reading data from the first portion prior to using the first processor to read data from the second portion.

18. A machine-accessible medium, which when accessed results in a machine performing operations comprising:

for each unit of data transferred between a first processor and a second processor, filling a cache set of a cache memory with data associated with addresses in a main memory that correspond to the cache set either after the first processor writes a unit of data to addresses that correspond to the cache set or before the first processor reads a unit of data written by the second processor to addresses that correspond to the cache set, with the data used to fill the cache set being associated with addresses that are different from the addresses associated with the unit of data.

19. The machine-accessible medium of claim 18 wherein filling the cache set with data comprises performing read operations to read data from addresses that are different from the addresses of the unit of data written by the second processor.

20. The machine-accessible medium of claim 18, which when accessed results in the machine allocating a first portion of the main memory so that it does not store data transferred between the first and second processors.

21. The machine-accessible medium of claim 20, which when accessed results in the machine performing operations further comprising reading data from the first portion after using the first processor to write data intended for the second processor.

22. The machine-accessible medium of claim 20, which when accessed results in the machine performing operations further comprising reading data from the first portion prior to using the first processor to read data written by the second processor.

23. An apparatus comprising:
a first processor that accesses a main memory and a cache memory, the cache memory being divided into cache sets, each cache set corresponding to predefined addresses in the main memory; and
a second processor that accesses the main memory directly without accessing the cache memory, with the first processor generating dummy read instructions either
after generating one or more write instructions to writs data intended for the second processor or
before generating one or more read instructions to read data that was written by the second processor, the dummy read instructions causing cached data to be evicted from a cache set.

24. The apparatus of claim 23 wherein the dummy read instructions comprise instructions to read data from addresses in the main memory that do not store data transferred between the first and second processors.

25. The apparatus of claim 23 wherein each cache set has n cache lines, n being an integer, and the first processor generates at least n dummy read instructions either after generating one or more write instructions to write data intended for the second processor or before generating one or more read instructions to read data that was written by the second processor.

26. The apparatus of claim 23 wherein the main memory comprises a first portion that does not store data transferred between the first and second processors.

27. The apparatus of claim 26 wherein the first portion of the main memory has a size that is at least the number of cache lines per cache set multiplied by the number of cache sets multiplied by the number of bytes per cache line.

28. A computer system comprising:
a main memory;
a cache memory that is divided into cache sets, each cache set having cache lines, each cache set corresponding to a predefined range of addresses in the main memory;
a first processor that accesses both the main memory and the cache memory;
a second processor that accesses the main memory directly without accessing the cache memory, with the first processor generating dummy read instructions either
   after generating one or more write instructions to write data intended for the second processor or
   before generating one or more read instructions to read data that was written by the second processor,
a memory management unit to control access of the cache memory by the first processor, and
a chipset to control access of the main memory by the first and second processors.

29. The computer system of claim 28, wherein the main memory comprises a first portion that does not store data transferred between the first and second processors.

30. The computer system of claim 28 wherein each cache set has n cache lines, n being an integer, and the first processor generates at least n dummy read instructions either
p1 after generating one or more write instructions to write data intended for the second processor or
   before generating one or more read instructions to read data tat was written by the second processor.

31. A system comprising
a router to route data in a network;
a first processor that accesses a main memory and a cache memory, the cache memory being divided into cache sets, each cache set corresponding to predefined addresses in the main memory; and
a second processor to process data routed by the router, the second processor accessing the main memory directly without accessing the cache memory, with the first processor generating dummy read instructions either
   after generating one or more write instructions to write data intended for the second processor or
   before generating one or more read instructions to read data that was written by the second processor to the main memory, the dummy read instructions causing cached data to be evicted from a cache set.

32. The system of claim 31 wherein the dummy read instructions comprise instructions to read data from addresses in the main memory that do not store data transferred between the first and second processors.

33. The system of claim 31 wherein each cache set has n cache lines, n being an integer, and the first processor generates at least n dummy read instructions either
   after generating one or more write instructions to write data intended for the second processor or
   before generating one or more read instructions to read data that was written by the second processor.

34. The system of claim 31 wherein the main memory comprises a first portion that does not store data transferred between the first and second processors.

35. The system of claim 34 wherein the first portion of the main memory has a size that is at least the number of cache lines per cache set multiplied by the number of cache sets multiplied by the number of bytes per cache line.

* * * * *